3,819,839
NUTMEAT COATING COMPOSITIONS FOR
CONFECTIONERY PRODUCTS
Michael J. Pichel, Ithaca, N.Y., assignor to
Swift & Company, Chicago, Ill.
Filed Feb. 7, 1972, Ser. No. 224,193
Int. Cl. A23g 3/00; A23l 1/36
U.S. Cl. 426—93                                    10 Claims

ABSTRACT OF THE DISCLOSURE

A method of preparing unique nutmeat-based coating compositions comprising a blend of nuts and a broad plastic range fat, and to confections and dairy products coated therewith.

---

This invention relates to edible coating compositions and more particularly to nutmeat-based coating fats having unique properties rendering such coating fats particularly useful in the coating of confections, frozen dairy products and the like.

Chocolate-flavored coatings and other flavored confection coatings such as butterscotch-flavored coatings are composed of coating fats which have certain well-defined characteristics in combination with the chocolate or other flavoring material. The fats used in such coatings have very short plastic ranges and sharp melting points. Cocoa butter and cocoa butter substitutes such as coconut oil, palm kernel oil, coconut or palm kernel stearines, and other naturally-occurring oils rich in lauric acid are required in coating fats currently in use. In addition, certain synthetic fat formulations having properties simulating the sharp melting point and short plastic range properties of the lauric acid type oils have also been suggested. For example, see U.S. Pat. 3,431,116 to Feuge et al.

In all cases these coating fats exhibit a short plastic range; that is, a sharp change in consistency with small changes in temperature as determined by solid fat index of the fat. Solid fat index (SFI) is an empirical measure of the solid fat content of fats and oils. It is calculated from the specific volumes of the fats and oils at various temperatures, and provides an excellent indication of the plastic range of a fatty material. Solid fat indexes may be determined by Tentative Method Cd 10–57 of the American Oil Chemists' Society, as set forth in "Official and Tentative Methods of the American Oil Chemists' Society," Third Edition. Solid Fat index is essentially the same as percent solids, and these terms are used interchangeably in the art.

The application of coating fats to confectionery base materials such as candy or ice cream bars is usually carried out by high-speed machines, and it is important that the coating materials utilized in these machines possess characteristics allowing for use of the fat in rapid, continuous operations. Thus, as is noted in *Industrial Oil and Fat Products*, 2nd Edition, by Alton E. Bailey, Interscience Publishers, Inc., New York (1951), page 326, coating fats must meet certain requirements such as rapid solidification, low setting point, and satisfactory viscosity for machine application.

In one embodiment of this invention, the coating composition is applied to the surface of frozen food products such as ice cream bars. Modern bar-dipping and packaging equipment has been designed to coat ice cream bars with chocolate coating containing conventional short plastic range coating fats. These machines represent a sizeable investment and in order to justify such expensive equipment, the machines are operated at high speed. This high-speed operation introduces a requirement that the ice cream coating composition have characteristics which insure that the coating, after application to the bar, will cease dripping in a matter of seconds, and harden to a firm form to be packaged in a matter of additional seconds. New coating compositions adapted for use in coating frozen confections such as ice cream bars must be formulated so that they can be applied with existing equipment.

U.S. Pats. 1,796,825 and 1,883,484 to Beatty et al. disclose nutmeat coating compositions comprising ground nutmeats in combination with a short plastic range fat or oil such as cocoa butter, coconut oil, or palm kernel oil. Although such coating compositions may be used to coat ice cream, these compositions are not suitable for use with today's high-speed bar dipping and packaging equipment inasmuch as the time required for the coating to set and dry is too long. Thus, the discovery of a nutmeat-based coating composition which will rapidly set and dry when used to coat ice cream represents a significant advance in the art.

In addition, the majority of coating flavoring materials, including chocolate, coconut, toffee, butterscotch, etc., do not add materially to the nutritional value of the confection, particularly insofar as protein content is concerned. Thus, the use of high-protein, naturally-flavored coating compositions in the confectionery industry, and particularly in the ice cream industry, represents a significant advance in the art.

It is, accordingly, an object of this invention to provide nut-flavored coating compositions containing nutmeats and a coating fat ingredient, said coating composition having a viscosity and setting point permitting the rapid coating of edible foodstuffs.

Another object of the invention is the provision of a method for manufacturing nutmeat coatings which can be handled by high-speed confectionery coating machines.

Still another object of the invention is to provide frozen confectionery items such as ice cream coated with a uniformly thin, continuous film of a high-protein nutmeat composition set to a non-sticky form.

Yet another object of the invention is to provide peanut-butter-coated ice cream novelty bars with said coating forming a uniformly thin, continuous film around substantially the entire surface of said bar.

Additional objects and advantages of the invention, if not specifically set forth herein, will be readily apparent to those skilled in the art from the following detailed description of the invention, taken in conjunction with the accompanying drawings, wherein.

Figure 1:
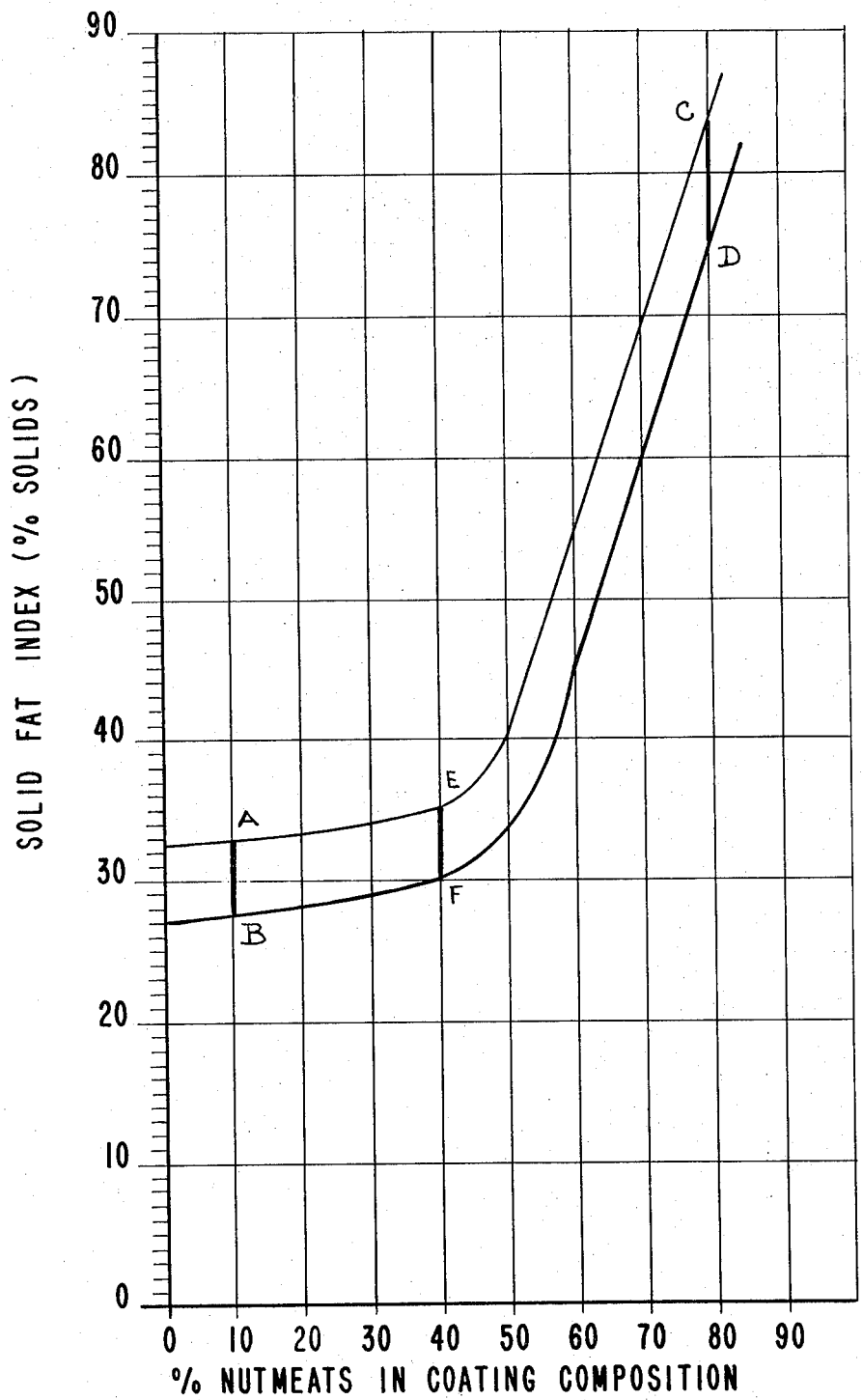
FIG. 1 is a graph showing suitable solid fat index values at 50° F. for varying percentages of nutmeats in the coating composition.

Generally, the compositions of this invention comprise ground nutmeats and a unique wide plastic range coating fat in combination to provide protein-rich coating compositions having low viscosity and a quick setting time. Plastic range of the fat in the coating composition is related to the amount of nutmeat present in the composition in a manner which insures that the composition is flowable and quick-setting, whether it contains a small amount of ground nutmeat or a major amount of ground nutmeat. The amount of fat in the composition and the consistency of the fat is determined by the amount of nutmeat in the composition. In all cases, however, the fat component of the coating material is a wide plastic range fat when compared with the short plastic range fats previously used in confectionery coating compositions.

The coating composition is formulated to possess viscosity characteristics, permitting envelopment of the entire surface of the material being coated with a uniformly thin layer of the coating which has good plasticity during storage, yet melts at a sufficiently low temperature so that it does not seem waxy on consumption. Thus, the coating compositions of the invention are highly nutritious, have an appealing appearance and good flavor, and also, possess characteristics rendering them highly desirable insofar as manufacturing operations are concerned.

More particularly, the coating compositions contemplated by this invention include about 10-80% ground nutmeats and about 20-90% wide plastic range fat, and preferably from about 40-80% nutmeat and from about 20-60% wide plastic range fat. The plastic range of the fat is related to percent solids in the fat at given temperatures, and thus the characteristics of the fatty component of the coating composition for a given amount of nutmeat may be expressed in SFI units at given temperatures, usually at 50° F., at 70° F., and at 92° F. In those cases where the composition contains a minor proportion of nutmeats in the range or about 10-40% nutmeats by weight, the SFI of the fat will be low as compared to the SFI of the fat utilized in a coating composition containing a predominant amount of nutmeats in the range of about 50-80% nutmeats.

The fat component of the nut coating composition is a wide plastic range fat, and is solid at room temperature (78° F.). The Wiley melting point of the fat is usually in the range of about 100-120° F. The fat component is markedly different from fats previously used as coating fats insofar as consistency is concerned. Conventional coating fats containing predominant amounts of fats such as cocoa butter, hydrogenated palm kernal oil and stearines pressed from coconut, palm kernal or other lauric acid oils, are characterized by a very short plastic range. SFI values for cocoa butter are 62 at 50° F., 49 at 70° F. and 0.3 at 92° F.; SFI values for coconut oil are 55 at 50° F., 27 at 70° F., and 0.0 at 92° F.; SFI values for palm kernel oil are 49 at 50° F., 33 at 70° F., and 0.0 at 92° F.

Figure 2:
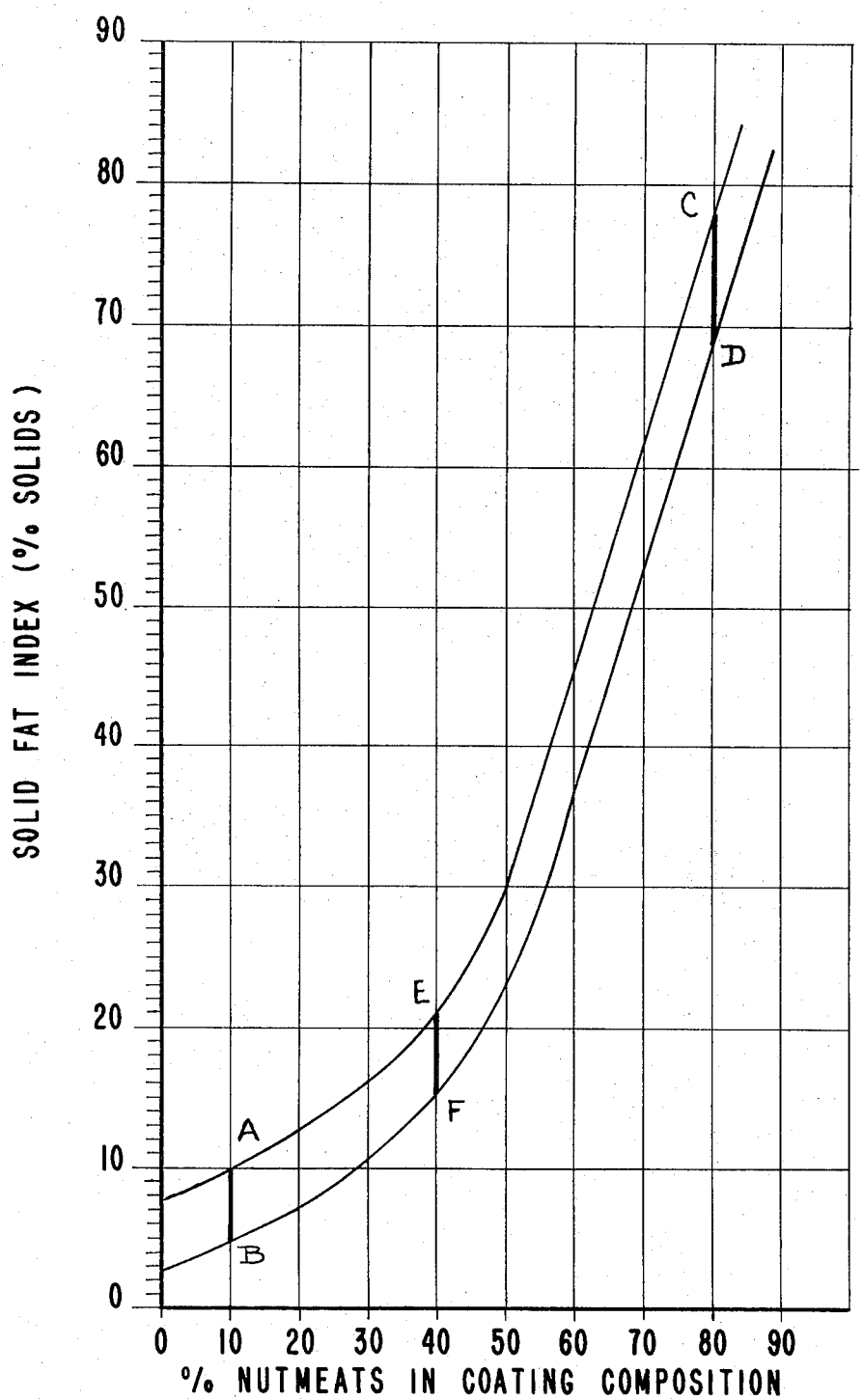
FIG. 2 is a graph showing suitable solid fat index values at 70° F. for varying percentages of nutmeats in the coating composition.
Figure 3:
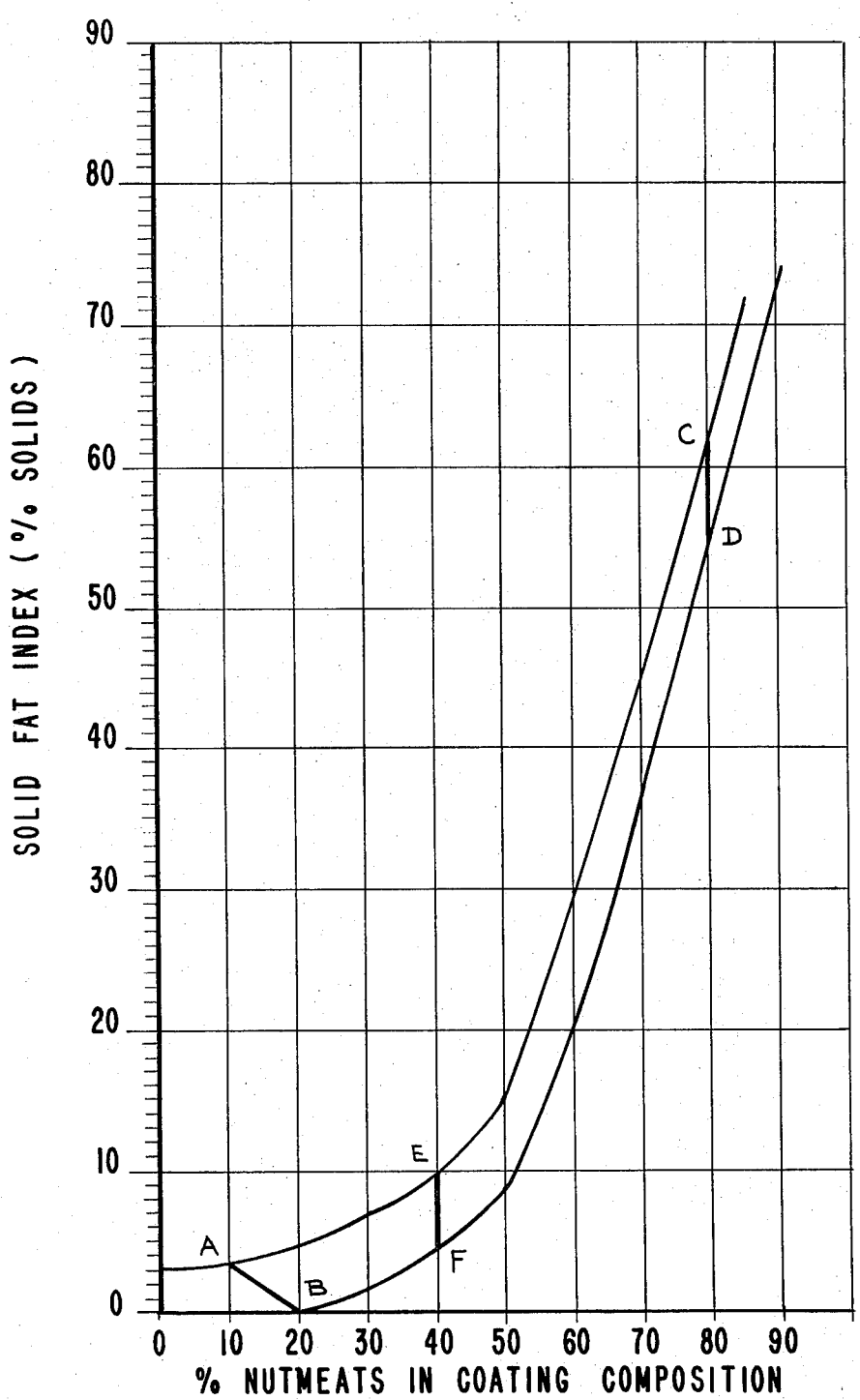
FIG. 3 is a graph showing suitable solid fat index values at 92° F. for varying percentages of nutmeats in the coating composition.

The wide plastic range fats employed in the present unique coating compositions may be defined as fats exhibiting a variation of less than about 15 SFI units with a temperature change of 9° F. in the range of 50-105° F. More particularly, the wide plastic range fats suitable in the present nutmeat-based coating compositions may be defined as those wide plastic range fats or fat mixtures having SFI values (percent solids) falling within the family of curves in the graphs of FIGS. 1-3. Thus when the ground nutmeat comprises 10-80% of the coating composition, the fat or fat mixture should have SFI values falling with the area ABCD defined by the curves of the three graphs. On the other hand, when the coating composition contains the preferred range of 40-80% ground nutmeat, then the wide plastic range fat or fat mixture should have SFI values falling within the area CDEF defined by the family of curves of the three graphs. For example, when one wishes to formulate a nutmeat-based coating composition comprising 50% ground nutmeat, one merely selects or formulates a fat compositions having SFI values falling along the 50% nutmeat line between the curves of FIGS. 1-3.

The fats employed in the nutmeat coating composition include any of the edible glyceride fats and oils, and mixtures thereof, formulated so as to possess the desired wide plastic range. Saturated and unsaturated naturally-occurring triglycerides such as animal, vegetable, and marine triglycerides can be employed in varying proportions in formulating the wide plastic range fats. If marine triglycerides are to be employed, care must be exercised to insure that no objectionable flavor is introduced into the composition as a result of fish flavor or odor. A typical nonlimiting group of such oils includes tallow, lard, peanut oil, cottonseed oil, soybean oil, corn oil, safflower oil, olive oil, sesame oil, palm oil, and sunflower seed oil, Usually, the oils are hardened by hydrogenation and the hardened oils are blended with liquid oils to obtain the desired plastic range.

The lauric acid oils such as coconut oil, palm kernel oil and their hydrogenated derivatives, and the vegetable butters such as cocoa butter can be employed in the fat component of the coating composition only in small amounts and never in predominant amounts. These fats exhibit rather sharp melting points, and softening and melting of the fat takes place over a very restricted temperature range. The lauric acid oils and vegetable butters pass very abruptly from brittle solids to liquids in a short temperature range, and for this reason have previously been favored in the coating fat industry. Nevertheless, it has been found that the typical coating fats cannot be employed in the nutmeat-based coatings of this invention as the major or only component of the fat ingredient, since nutmeat compositions containing large amounts of such fats are unsatisfactory from an operating standpoint. It has been found that the low-melting lauric acid oils and vegetable butters inhibit the crystallization rate of the oil present in the nutmeat and also inhibit the crystallization rate of other vegetable oils used in the coating composition, thus promoting a drip time and a set time which is too long, and thus impractical for use in modern coating and packaging machinery.

Peanut butter coatings containing predominant amounts of lauric acid oils as the added oil do not set rapidly enough to prevent the coatings from running off ice cream bars for example, with the result that an unevenly coated bar is produced. Accordingly, although small amounts of lauric acid oils and vegetable butters may be included in the fat portion of the nut coatings of the invention, there must be a sufficient amount of wide plastic range fat present to produce in the total fat component the required plastic range for the amount of nutmeat employed. Other ingredients such as flavoring agents, coloring agents, stabilizers, etc., may optionally be incorporated in the coating, as desired. Usually a small amount of sugar and salt will be used to enhance the nut flavor.

In the preparation of the nutmeats as a component of the coating, the nuts are ground to a fine particle size and thoroughly admixed with the fat. Although the coatings of the invention can be made from a variety of cooked nuts such as almonds, walnuts, pecans and filberts, the invention is described in its preferred form utilizing peanuts as the nut component because of the wide appeal of peanut-flavored and peanut-butter-containing confections. It should be noted that the composition of nutmeats are quite similar, and that the graphs of FIGS. 1-3 may be used for all nutmeats, particularly peanuts, walnuts, almonds, pecans and filberts.

Usually the peanuts are roasted, then crushed or ground to about the form of a paste similar to peanut butter, and then the fat component of the coating composition is combined with the ground peanuts to form a homogeneous mixture. It is recommended that the fat be heated to a temperature above the melting point of the fat prior to incorporation with the ground peanuts to insure uniform dispersion of the fat and peanut solids. It is also possible to first mix the fat and ground peanuts and then heat the mixture to obtain uniform distribution of the fat and solids. If the coating composition is to be packaged and shipped to the point of use, the mix can be chilled by conventional means and packaged for efficient handling, or packaged without cooling.

In an important and preferred use of the coating compositions, they must have characteristics which permit the use of these compositions on machinery used in the ice cream and confectionery industries. The coatings of the invention possess characteristics which allow for their use in coating frozen confections utilizing automatic stick confection machines as are disclosed in U.S. Pat. 2,884,-

875 and U.S. Pat. 3,031,978 of Marlin B. Rassmussen. These devices can be used to rapidly and continuously produce frozen confections such as ice cream in the form of a tapered block provided with a partially embedded wooden stick.

In the operation of such machines, there is provided a bar coating station just after removal of the bars from the forming molds and just prior to the packaging or bagging device. Because of the high speed operation of the machines, only a short period of time, usually not more than about twenty seconds, is permitted between the time of removal of the bars from the coating bath and the bagging and discharge station. Thus any coating applied to the surface of the bar must have hardened and be non-tacky as the coated bar reaches the bagging station. This time interval after removal from the coating applicator includes what is referred to in the art as "drip time" and "set dry time." The total elapsed time from application of the warm (105-115° F.) coating to the surface of the bar to the point at which the coated bar is "dry" to the touch and can be packaged should not exceed about fourteen seconds in the preferred form of the invention. The "drip time" is that period during which a very limited amount of the coating composition drips from the bar and the "set time" is that interval after cessation of dripping during which the coating becomes hard and non-tacky.

When the coating is "set," it feels dry to the touch and the coated bar can be handled and packaged without smearing of the coating or adhesion of the coating to the wrapping materials. The major part of the time period of about 9–18 seconds elapsed time between application of the coating and development of a non-tacky smearproof surface is taken up by "drip time" with only a comparatively short time being required for "drying."

The examples which follow are intended to illustrate specific embodiments of the invention and the best mode of carrying out the invention. The examples are not to be considered limitative, since the scope of the invention is defined in the appended claims.

Example I 69.5 pounds of ground, roasted peanuts were placed in a kettle and 4.95 pounds of sugar and 0.75 pounds of salt were added. 24.8 pounds of hydrogenated soybean oil was heated to 130° F. and the heated oil was added to the kettle and the contents agitated for 5–10 minutes until a smooth, uniform dispersion was formed. The hydrogenated soybean oil had a Wiley melting point of 120° F. and had a plastic range represented by SFI values as follows:

$SFI_{50° F.}$ ---------------------------------------- 65.0
$SFI_{70° F.}$ ---------------------------------------- 55.0
$SFI_{92° F.}$ ---------------------------------------- 38.0

Frozen ice cream bars were dipped in the coating composition which had been previously heated to 115° F. The bars were removed from the liquid coating bath and the time to cessation of dripping of the coating from the bar was noted. The time for setting of the coating to a hard, non-sticky, continuous surface was also noted. The drip time was 9 seconds and the set time was an additional 3 seconds. An elapsed time of 12 seconds from removal of the coated bar from the coating bath to the setting of a uniformly thin, continuous coating on the bar is sufficiently rapid to permit the use of the coating composition in automatic coating and packaging equipment.

Example II

The same ingredients in the same amounts were used in the coating composition of this example as were employed in the coating described in Example I, with the exception of the fat. In this example, a mixture of 9 pounds of 92° titer hydrogenated coconut oil and 15.8 pounds of hydrogenated cottonseed oil was substituted for the hydrogenated soybean oil of Example I. The mixture of 9 pounds 92° titer hydrogenated coconut oil and 15.8 pounds hydrogenated cottonseed oil had a plastic range defined by the following SFI values:

$SFI_{50° F.}$ ---------------------------------------- 65.0
$SFI_{70° F.}$ ---------------------------------------- 53.0
$SFI_{92° F.}$ ---------------------------------------- 37.0

The procedure followed in Example I was utilized in coating ice cream bars with the peanut butter coating of this example and drip time was 10 seconds, whereas set time was 4 seconds, a total time well within the limits of automatic equipment.

Example III

Another coating composition which can be employed in coating frozen confections was prepared by the procedure of Example I using the following ingredients:

| | Parts by weight |
|---|---|
| Ground, roasted peanuts | 50 |
| Fat | 44.36 |
| Sugar | 4.90 |
| Salt | 0.74 |

The fat was hydrogenated soybean oil having a consistency represented by the following values:

$SFI_{50° F.}$ ---------------------------------------- 36
$SFI_{70° F.}$ ---------------------------------------- 27
$SFI_{92° F.}$ ---------------------------------------- 12

Generally rectangular ice cream bars of a size 3½″ x 2″ x ¾″ were coated with this composition using the machinery of the type disclosed in U.S. Pat. 3,031,978 and it was found that 35 lb. of coating composition satisfactorily coated 1480 bars for an average of 10.7 grams coating per bar. The coating was about 1/16 inches in thickness. Drip time was 7 seconds and set time 4 seconds, for an overall time for completion of coating to bagging of 11 seconds. The coating composition was held at a temperature of 105°–115° F. in the coating supply tank.

Obviously, many modifications and variations of the invention as hereinbefore set forth may be made without departing from the spirit and scope thereof and, therefore, only those limitations should be imposed as are indicated in the appended claims.

I claim:

1. An edible composition comprising a confectionery coated with from about 10–80% ground nuts in combination with from about 20–90% of a wide plastic range fat, said fat having been formulated so as to provide a solid fat index falling within the area ABCD defined by the family of curves in the Figures.

2. The composition of claim 1 wherein the confectionery is a frozen ice cream novelty.

3. The composition of claim 1 wherein from about 40–80% ground peanuts are in combination with from about 20–60% of a wide plastic range fat having a solid fat index falling within the area CDEF defined by the family of curves in the Figures.

4. The composition of claim 3 wherein the confectionery is a frozen ice cream novelty.

5. A method for preparing an edible confectionery comprising combining from about 10–80% ground nuts with from about 20–90% of a wide plastic range fat which has been formulated so as to provide a solid fat index falling within the area ABCD defined by the family of curves in the Figures, blending said fat with said ground nuts and heating said blend to form a homogeneous dispersion thereof, and coating a confectionery with said dispersion.

6. The method of claim 5 wherein the confectionary is a frozen ice cream novelty.

7. The method of claim 5 wherein from about 40–80% nuts is combined with from about 20–60% fat having a solid fat index falling within the area CDEF defined by the family of curves in the Figures.

8. The method of claim 7 wherein the confectionery is a frozen ice cream novelty.

9. The method of claim 7 wherein the nuts are peanuts, and wherein the fat is selected from the group consisting of tallow, lard, peanut oil, soybean oil, corn oil, safflower oil, cottonseed oil, olive oil, sesame oil, palm oil, sunflower seed oil, and mixtures thereof.

10. The method of claim 9 wherein the confectionery is a frozen ice cream bar.

References Cited

UNITED STATES PATENTS

| | | | |
|---|---|---|---|
| 1,796,825 | 3/1931 | Beatty | 99—126 X |
| 1,883,484 | 10/1932 | Beatty | 99—126 X |
| 1,154,059 | 9/1915 | Rosell | 99—134 R |
| 2,079,288 | 5/1937 | Hoffman | 99—128 |
| 2,255,032 | 9/1941 | Weisgurt | 99—128 |
| 2,911,303 | 11/1959 | Rowland | 99—128 |
| 3,333,968 | 8/1967 | Bell | 99—136 X |
| 3,361,568 | 1/1968 | Kidger | 99—166 Y |

FOREIGN PATENTS

| | | | |
|---|---|---|---|
| 571,100 | 9/1958 | Belgium | 99—26 |
| 773,159 | 8/1934 | France | 99—126 |
| 345,904 | 4/1931 | Great Britain | 99—134 R |

ROBERT HALPER, Primary Examiner

U.S. Cl. X.R.

426—103, 307